(12) United States Patent
Collias et al.

(10) Patent No.: US 7,896,168 B2
(45) Date of Patent: *Mar. 1, 2011

(54) FILTERS HAVING IMPROVED PERMEABILITY AND VIRUS REMOVAL CAPABILITIES

(75) Inventors: Dimitris Ioannis Collias, Mason, OH (US); Stephen Allen Goldman, Cincinnati, OH (US); Michael Donovan Mitchell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 546 days.

This patent is subject to a terminal disclaimer.

(21) Appl. No.: 11/942,334

(22) Filed: Nov. 19, 2007

(65) Prior Publication Data
US 2008/0105611 A1    May 8, 2008

Related U.S. Application Data (63) Continuation-in-part of application No. 10/840,578, filed on May 6, 2004, now Pat. No. 7,316,323.

(51) Int. Cl.
*B01D 24/00* (2006.01)
*B01D 39/00* (2006.01)
*B01D 61/00* (2006.01)

(52) U.S. Cl. .................. 210/506; 210/510.1; 210/501; 210/502.1; 210/503; 210/87; 210/90; 210/282; 96/153; 96/226; 95/285

(58) Field of Classification Search .............. None
See application file for complete search history.

(56) References Cited

U.S. PATENT DOCUMENTS 4,969,996 A    11/1990    Hankammer (Continued)

FOREIGN PATENT DOCUMENTS

EP    0616975 A2    9/1994

(Continued)

OTHER PUBLICATIONS

USPTO Office Action dated Jul. 17, 2006 in commonly assigned U.S. Appl. No. 10/840,578.

(Continued)

*Primary Examiner*—Krishnan S Menon
(74) *Attorney, Agent, or Firm*—Cynthia L. Clay; Kim William Zerby (57) ABSTRACT

A filter block may comprise activated carbon filter particles without metallic biocides. The activated carbon filter particles may have a median particle size of less than or equal to about 90 microns and having a particle span of less than or equal to about 1.7. The filter block may have a permeability of greater than about $3.0 \times 10^{-9}$ cm$^2$ and a Filter Viruses Log Removal of greater than about 2 logs. A portion of the activated carbon filter particles may be coated with a cationic polymer. Another filter block may comprise mesoporous activated carbon filter particles without metallic biocides, wherein the mesoporous activated carbon filter particles may have a median particle size of less than or equal to about 104 μm and a particle span of less than or equal to about 2.05, and wherein at least a portion of the filter particles may be coated with a cationic polymer. The filter block may have a permeability of greater than about $2.0 \times 10^{-9}$ cm$^2$ and a Filter Viruses Log Removal of greater than about 2 logs.

25 Claims, 3 Drawing Sheets

U.S. PATENT DOCUMENTS

| | | |
|---|---|---|
| 5,331,037 A | 7/1994 | Koslow |
| 5,431,813 A | 7/1995 | Daniels |
| 5,527,451 A | 6/1996 | Hembree et al. |
| 5,536,394 A | 7/1996 | Lund et al. |
| 5,679,248 A | 10/1997 | Blaney |
| 5,709,794 A | 1/1998 | Emmons et al. |
| 5,882,507 A | 3/1999 | Tanner et al. |
| 5,922,803 A | 7/1999 | Koslow et al. |
| 5,928,588 A | 7/1999 | Chen et al. |
| 5,957,034 A | 9/1999 | Sham et al. |
| 6,077,588 A | 6/2000 | Koslow et al. |
| 6,103,114 A | 8/2000 | Tanner et al. |
| 6,120,685 A | 9/2000 | Carlson et al. |
| 6,145,670 A | 11/2000 | Risser |
| 6,214,224 B1 | 4/2001 | Farley |
| 6,241,899 B1 | 6/2001 | Ramos |
| 6,368,504 B1 | 4/2002 | Kuennen et al. |
| 6,395,190 B1 | 5/2002 | Koslow et al. |
| 6,630,016 B2 | 10/2003 | Koslow |
| 6,827,854 B2 | 12/2004 | Mitchell et al. |
| 2003/0034290 A1 | 2/2003 | Tochikubo et al. |
| 2003/0217963 A1 | 11/2003 | Mitchell et al. |
| 2003/0217967 A1 | 11/2003 | Mitchell et al. |

FOREIGN PATENT DOCUMENTS

| | | |
|---|---|---|
| EP | 0616975 A3 | 9/1994 |
| EP | 0616975 B1 | 9/1994 |
| WO | WO 9843796 A1 | 10/1998 |
| WO | WO 00/71467 A1 | 11/2000 |
| WO | WO 03018483 A1 | 3/2003 |
| WO | WO 03068686 A2 | 8/2003 |

OTHER PUBLICATIONS

USPTO Office Action dated Jan. 11, 2007 in commonly assigned U.S. Appl. No. 10/840,578.

USPTO Office Action dated May 16, 2007 in commonly assigned U.S. Appl. No. 10/840,578.

FILTERS HAVING IMPROVED PERMEABILITY AND VIRUS REMOVAL CAPABILITIES

CROSS REFERENCE TO RELATED APPLICATIONS

This application is a continuation-in-part of U.S. patent application Ser. No. 10/840,578, filed May 6, 2004, now U.S. Pat. No. 7,316,323.

FIELD OF THE INVENTION

The present invention relates to the field of filter materials, filters made from those materials and, more particularly, to the field of water filters.

BACKGROUND OF THE INVENTION

Water may contain many different kinds of contaminants including, for example, particulates, chemicals, and microbiological organisms, such as bacteria, viruses, and protozoa. In a variety of circumstances, these contaminants must be reduced in concentration or completely removed before the water can be used. For example, in many medical applications and in the manufacture of certain electronic components, extremely pure water is required. As a more common example, any harmful contaminants must be removed from the water before it is potable, i.e., fit to consume.

The quality of water varies widely around the world. In the U.S. and other developed countries, drinking water is typically municipally treated. During that treatment, contaminants, such as suspended solids, organic matter, heavy metals, chlorine, bacteria, viruses, and protozoa are removed from the water before it is discharged to the homes of consumers. However, equipment malfunction and/or infrastructure breakdown and other problems with water treatment utilities can lead to incomplete removal of the contaminants.

Many developing countries are without water treatment utilities. As such, there are deadly consequences associated with exposure to contaminated water, as many developing countries have increasing population densities, increasingly scarce water resources, and no water treatment utilities. It is common for sources of drinking water to be in close proximity to human and animal waste, such that microbiological contamination is a major health concern.

As a result of waterborne microbiological contamination, an estimated six million people die each year, half of which are children under 5 years of age. In 1987, the U.S. Environmental Protection Agency (herein "EPA") introduced the "Guide Standard and Protocol for Testing Microbiological Water Purifiers". This guide standard and protocol provides guidelines and performance requirements for drinking water treatment systems that are designed to reduce specific health related contaminants in public or private water supplies. The requirements are that the effluent from a water treatment system exhibits 99.99% (or equivalently, 4 log) removal of viruses, 99.9999% (or equivalently, 6 log) removal of bacteria, and 99.9% (or equivalently, 3 log) removal of protozoa (cysts) against a challenge.

Under the EPA guide standard and protocol, in the case of viruses, the influent concentration should be about $1\times10^7$ viruses per liter (PFU/L), and in the case of bacteria, the influent concentration should be about $1\times10^8$ bacteria per liter (CFU/L). Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

It was believed by those skilled in the relevant art that small suspended particles, for example, bacteria and viruses, are best filtered by filters having small interstitial spacing between filter particles. Small space between filter particles is best achieved by close packing of the filter particles. One way to achieve close packing is described in published PCT application WO 00/71467 A1, in the name of Tremblay et al., which teaches the use of small particles to fill in the spaces between larger particles. This provides close packing by using filter particles having a bi-modal size distribution. Moreover, U.S. Pat. Nos. 5,922,803 and 6,368,504 B1, issued to Koslow et al. and Kuennen et al., respectively, teach the general principle of using filter particles having a narrow particle size distribution, that is, particles that are generally all the same size, to insure that the interstitial spacing between particles is relatively uniform. The average particle size of these two narrow particle size distribution patents ranges from 80 μm to 45 μm. These patents describe filters that achieve either a relatively high level of virus removal with a high pressure drop across the filter or low virus removal since the average filter particle size is relatively large although the size distribution is narrow.

A high pressure drop across a filter can cause reduced flow and other problems that are viewed negatively by filter users. Going to smaller particle sizes, for example, less than 45 μm was believed to further exacerbate the pressure drop across a filter. Moreover, those skilled in the art will appreciate that the pressure drop has a direct impact on flow rate through a filter block. Consumers typically have water delivered to their homes at a fixed pressure (from the municipality or from a pump in their well, for example). Thus a filter block with a high pressure drop will have a slower flow rate than one with a smaller pressure drop. As can be appreciated, consumers do not like to wait long periods of time for their water, so high flow rates are preferred. As such, filter blocks with low pressure drops are necessarily preferred by consumers. Thus, there exists a need for filters, processes for manufacturing filter materials and filter materials which are capable of removing bacteria and/or viruses from a fluid without the disadvantageous increase in pressure drop exhibited by filters of the prior art.

SUMMARY OF THE INVENTION

In one aspect of the present invention there is provided a filter block having a permeability of greater than about $3.0\times10^{-9}$ cm$^2$, and a F-VLR of greater than about 99%. Preferably the permeability is greater than about $3.5\times10^{-9}$ cm$^2$, more preferably greater than about $4.0\times10^{-9}$ cm$^2$ even more preferably greater than about $4.5\times10^{-9}$ cm$^2$ and most preferably greater than about $5.0\times10^{-9}$ cm$^2$. Preferably, the F-VLR is greater than about 99.9%, more preferably greater than about 99.99%, and even more preferably greater than about 99.999%, and most preferably greater than about 99.9999%. Additionally, it is preferred that the filter blocks of the present invention have a F-BLR of greater than about 99.99%, preferably greater than about 99.999%, and more preferably greater than about 99.9999%.

In another aspect of the present invention the preferred filter permeability is obtained by making the filter block from filter particles having a median particle size of less than about 50 µm, preferably less than about 40 µm, more preferably less than about 37.5 µm, and even more preferably less than about 35 µm. In yet another aspect of the present invention the filter particles have a particle span of about 1.8 or less, preferably 1.5 or less, more preferably 1.4 or less, and even more preferably 1.3 or less.

It has been surprising determined that filter permeability is an important parameter for regulating the pressure drop across a filter while simultaneously improving the removal of small suspended particles such as bacteria and viruses. As discussed above, it was generally believed that improvements in the removal of small suspended particles came only at the expense of a filter's flow properties. The present invention proves that this is not the case, and as such, provides a substantial benefit over the teachings of the prior art. More specifically, the present invention provides the manufacturers and designers of filters a filter parameter that optimizes the removal of small suspended particles with little or no reduction in filter flow characteristics. Methods of making filters, and filter materials used therein are also taught.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

All documents cited are, in relevant part, incorporated herein by reference. The citation of any document is not to be construed as an admission that it is prior art with respect to the present invention.

I. Definitions

As used herein, the terms "filters" and "filtration" refer to structures and mechanisms, respectively, associated with microorganism removal (and/or other contaminant removal), via primarily adsorption and/or size exclusion to a lesser extent.

As used herein, the phrase "filter material" is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form. For example, a filter material might comprise mesoporous and basic activated carbon particles in combination with activated carbon fibers, and these filter particles may be either provided in loose association or partially or wholly bonded by a polymeric binder or other means to form an integral structure.

As used herein, the phrase "filter particle" is intended to refer to an individual member or piece, which is used to form at least part of a filter material. For example, a fiber, a granule, a bead, etc. are each considered filter particles herein. Further, the filter particles can vary in size, from impalpable filter particles (e.g., a very fine powder) to palpable filter particles.

As used herein, the phrase "filter block" is intended to refer to a mixture of filter particles bound together to form a structure that is capable of filtering a liquid, for example water, air, hydrocarbons, and the like. As such a filter block may comprise filter particles, binder particles, and other particles or fibers for the removal of specific contaminants, such as lead, mercury, arsenic, etc. A filter block can vary in geometry and flow patterns. Examples of radial flow and axial flow filter blocks are described herein (see for example, FIGS. 1 and 2), but other filter configurations, for example plate and conical, will be known to those skilled in the art. The examples given herein are illustrative only and are not intended to limit the present invention. Often, but not always, the filter block is encased in a "filter housing" which protects the filter block from damage and provides seals between the "dirty" liquid being filtered and the "clean" liquid leaving the filter as the desired product. While these sealing surfaces may be permanently attached to, or integral with the filter block, and necessary to separate the clean liquid from the dirty liquid, they are not considered part of the filter block for purposes of the calculations herein.

As used herein, the phrase "median particle size" refers to the diameter of a particle below or above which 50% of the total volume of particles lies. This median particle size is designated as $D_{v,0.50}$. While many methods and machines are known to those skilled in the art for fractionating particles into discreet sizes, sieving is one of the easiest, least expensive and common ways to measure particle sizes and particle size distributions. An alternative preferred method for determining size distribution of particles is with light scattering. Further, the phrase, "particle span" is a statistical representation of a given particle sample and can be calculated as follows. First, the median particle size, $D_{v,0.50}$, is calculated as described above. Then by a similar method, the particle size that separates the particle sample at the 10% by volume fraction, $D_{v,0.10}$, is determined, and then the particle size that separates the particle sample at the 90% by volume fraction, $D_{v,0.90}$, is determined. The particle span is then equal to: $(D_{v,0.90}-D_{v,0.10})/D_{v,0.50}$.

As used herein, the phrase "filter block pore volume" refers to the total volume of the inter-particle pores (also called interstitial spacings) in the filter block with sizes larger than 0.1 µm.

As used herein, the phrase "filter block volume" refers to the sum of the filter block pore volume and the volume occupied by the filter particles. That is, the filter block volume is the total volume of the filter block calculated based on the external dimensions of the filter block. For example, in FIG. 1, the filter block volume is calculated as: $\pi L_r(r_2^2-r_1^2)$, and in FIG. 2, the filter block volume is calculated as: $\pi L_a r_a^2$. The units used herein are generally cm, but those skilled in the art will recognize that any appropriate units of length can be used for L and r.

As used herein, the terms "microorganism", "microbiological organism", "microbial", and "pathogen" are used interchangeably. These terms refer to various types of microorganisms that can be characterized as bacteria, viruses, parasites, protozoa, and germs.

As used herein, the phrase "Filter Bacteria Log Removal (F-BLR)" refers to the bacteria removal capability of the filter after the volumetric flow of liquid is equal to at least 10 filter block volumes and the liquid flow rate through the filter block is equal at least 600 mL/min. The F-BLR is defined and calculated as:

F-BLR=−log [(effluent concentration of *E. coli*)/(influent concentration of *E. coli*)], where the "influent concentration of *E. coli*" is set to about $1\times10^8$ CFU/L continuously throughout the test and the "effluent concentration of *E. coli*" is measured after the volumetric flow of liquid through the filter block is equal to at least 10 filter block volumes. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects.

As used herein, the phrase "Filter Viruses Log Removal (F-VLR)" refers to the viruses removal capability of the filter after the volumetric flow of liquid is equal to at least 10 filter block volumes and the liquid flow rate through the filter block is equal at least 600 mL/min. The F-VLR is defined and calculated as:

F-VLR=−log [(effluent concentration of *MS*-2)/(influent concentration of *MS*-2)], where the "influent concentration of MS-2" is set to about $1\times10^7$ PFU/L continuously throughout the test and the "effluent concentration of MS-2" is measured after the volumetric flow of liquid through the filter block is equal to at least 10 filter block volumes. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the F-VLR is measured without application of chemical agents that provide virucidal effects.

As used herein, the term "micropore" is intended to refer to an intra-particle pore having a width or diameter less than 2 nm (or equivalently, 20 Å).

As used herein, the term "mesopore" is intended to refer to an intra-particle pore having a width or diameter between 2 nm and 50 nm (or equivalently, between 20 Å and 500 Å).

As used herein, the term "macropore" is intended to refer to an intra-particle pore having a width or diameter greater than 50 nm (or equivalently, 500 Å).

As used herein, the phrase "total pore volume" and its derivatives are intended to refer to the volume of all the intra-particle pores, i.e., micropores, mesopores, and macropores. The total pore volume is calculated as the volume of nitrogen adsorbed at a relative pressure of 0.9814 using the BET process (ASTM D 4820-99 standard), a process well known in the art.

As used herein, the phrase "micropore volume" and its derivatives are intended to refer to the volume of all micropores. The micropore volume is calculated from the volume of nitrogen adsorbed at a relative pressure of 0.15 using the BET process (ASTM D 4820-99 standard), a process well known in the art.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the phrase "pore size distribution in the mesopore range" is intended to refer to the distribution of the pore size as calculated by the Barrett, Joyner, and Halenda (BJH) process, a process well known in the art.

As used herein, the term "carbonization" and its derivatives are intended to refer to a process in which the non-carbon atoms in a carbonaceous substance are reduced.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process.

As used herein, the phrase "mesoporous activated carbon filter particle" refers to an activated carbon filter particle wherein the sum of the mesopore and macropore volumes may be greater than 0.12 mL/g.

As used herein, the phrase "microporous activated carbon filter particle" refers to an activated carbon filter particle wherein the sum of the mesopore and macropore volumes may be less than 0.12 mL/g.

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "axial flow" refers to flow through a planar surface and perpendicularly to that surface.

As used herein, the phrase "radial flow" typically refers to flow through essentially cylindrical or essentially conical surfaces and perpendicularly to those surfaces.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

II. Permeability

It has unexpectedly been determined that a key parameter for filter block design is the filter's permeability. As discussed above, prior attempts to make filter blocks that remove small, that is, sub-micron suspended particles, resulted in filter blocks with poor flow characteristics, and more specifically, high pressure drops across the filter blocks. It turns out that these prior filter blocks have low permeability, see for example, Table 1 in the Example section herein.

Permeability is an intrinsic property of a filter block that can be calculated for a given flow rate, pressure drop across the filter block, viscosity of the filtered fluid and the general geometric measurements of the filter block. The following two formulae can be used to calculate the permeability for radial and axial flow filter blocks, which are among the most commonly used filter blocks, and the preferred configuration of the filter blocks disclosed herein. Those skilled in the art will easily be able to adapt these formulae to other filter block geometries. The permeability of a radial flow filter block is calculated as:

$$\kappa_r = \frac{\mu}{2\pi} \frac{\ln(r_2/r_1)}{L_r} \frac{Q_r}{\Delta P_r},$$

and the permeability of an axial flow filter block is calculated as:

$$\kappa_a = \frac{\mu}{\pi} \frac{L_a}{r_a^2} \frac{Q_a}{\Delta P_a},$$

wherein: $Q_r$ is the radial flow rate, $Q_a$ is the axial flow rate (in mL/s, or cm³/s), $\mu$ is the viscosity (in poise or dynes-s/cm²), In is the natural log, $r_a$ is the radius of an axial flow filter, $r_2$ is the outside radius of a radial flow filter, $r_1$ is the inside radius of a radial flow filter (all in cm), $\Delta P_r$ is the pressure drop of a radial flow filter, $\Delta P_a$ is the pressure drop of an axial flow filter (in dynes/cm²), $L_r$ is the length of a radial flow filter, and $L_a$ is the length of an axial flow filter (in cm).

Figure 1:
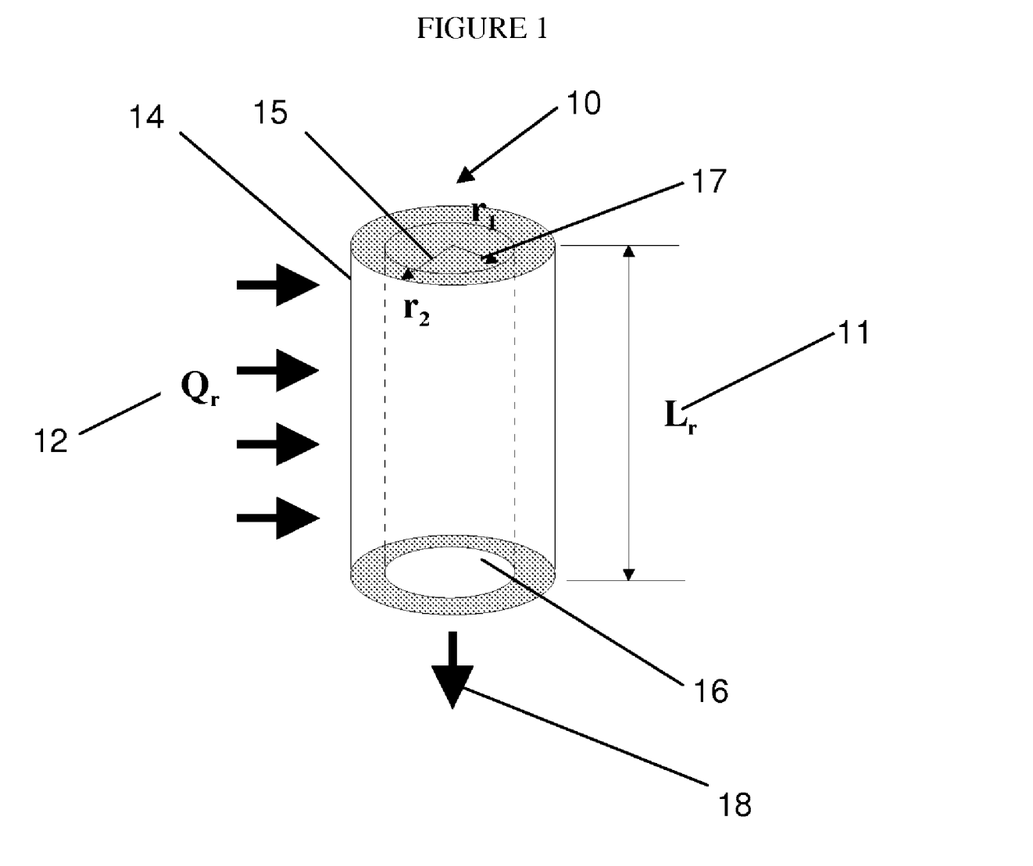
FIG. 1 is a schematic representation of flow through a radial filter block.

Turning now to FIG. 1, which is a schematic representation of a radial flow filter block 10 according to the present invention, the inlet, or "dirty" flow 12, designated as $Q_r$, is shown entering the exterior surface area 14, which has an exterior or outside radius 15 designated as $r_2$. Flow 12 travels through filter block 10 to interior hollow core 16 which has an interior radius 17 designated as $r_1$. The filtered, or "clean" flow 18 then flows downward through hollow core 16 into a collection vessel (not shown). Filter block 10 has a length 11, designated as $L_r$.

Figure 2:
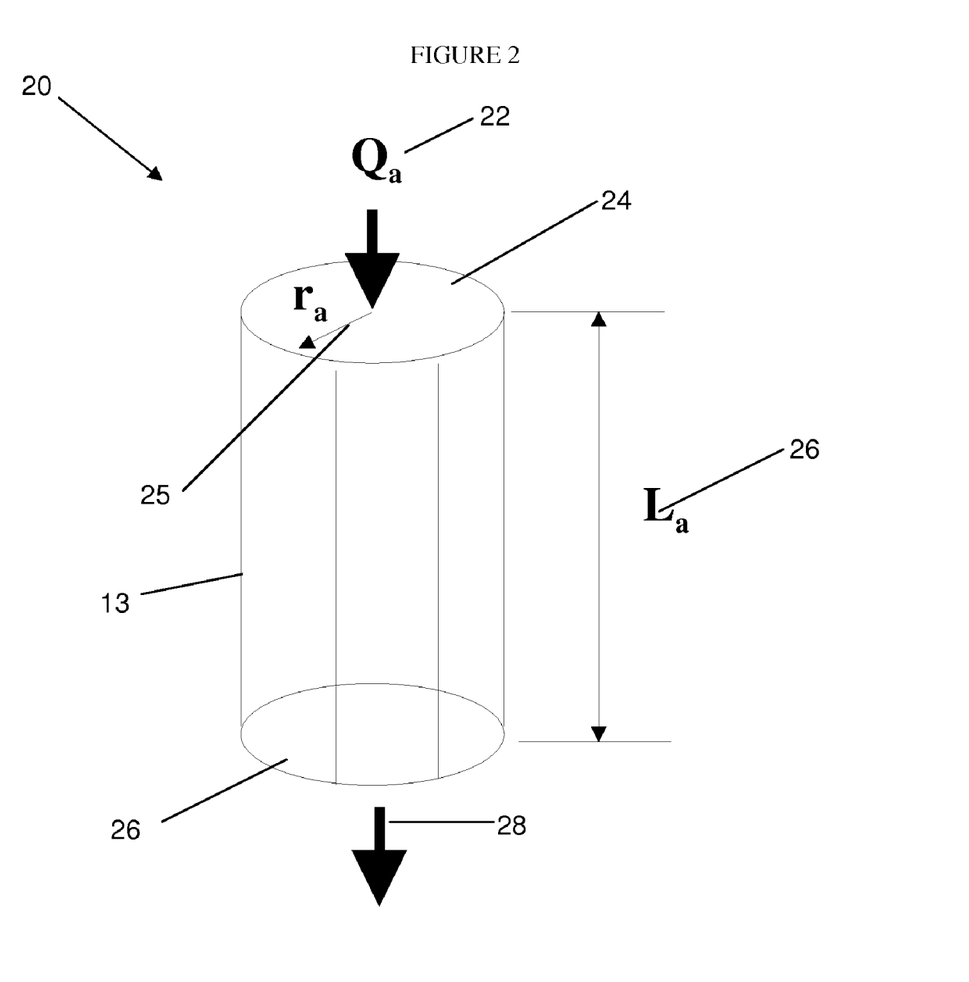
FIG. 2 is a schematic representation of flow through an axial filter block.

Turning now to FIG. 2, which is a schematic representation of an axial flow filter block 20 according to the present invention, the inlet, or "dirty" flow, 22, designated as $Q_a$, is shown entering the top surface, or face area, 24, which has a radius 25 designated as $r_a$. Flow 22 travels through filter block 20 to the bottom surface 26. The filtered, or "clean" flow 28 then flows into a collection vessel (not shown). Filter block 20 has a length 21, designated as $L_a$. The exterior surface area 13 of an axial filter block 20 is typically sealed so that the liquid being filtered must travel the entire axial length of filter block 20.

In a preferred aspect of the present invention, the outside radius of the filter block, that is, either $r_a$ or $r_2$ is less than about 10 cm, preferably less than about 7.5 cm, and more preferably less than about 5 cm. Moreover it is preferred that the filter block volume is less than about 2000 mL, preferably less than about 1000 mL, more preferably less than about 200 mL, more preferably less than about 100 mL, and even more preferably less than about 50 mL. Those skilled in the art will appreciate that the volume of a radial filter block excludes the volume of the hollow core.

III. Filter Particles

Preferred filter particles for use in the present invention are carbon particles, more preferred are activated carbon particles, and even more preferred are mesoporous activated carbon particles. For a detailed description and further definition of mesoporous activated carbon filter particles see the following printed publications and co-pending patent applications: PCT applications US02/27000, US02/27002, US03/05416, US03/05409, U.S. patent application Ser. Nos. 10/464,210, 10/464,209, 10/705,572, and 10/705,174, all filed in the name of Mitchell et al. and all assigned to the Procter & Gamble Co. All of the aforementioned applications are incorporated herein by reference in their entirety.

Unexpectedly it has been found that mesoporous activated carbon filter particles adsorb a larger number of microorganisms compared to microporous activated carbon filter particles. Also, unexpectedly it has been found that mesoporous and basic activated carbon filter particles adsorb a larger number of microorganisms compared to that adsorbed by mesoporous and acidic activated carbon filter particles. Furthermore, it has been found unexpectedly that mesoporous, basic, and reduced-oxygen activated carbon filter particles adsorb a larger number of microorganisms compared to that adsorbed by mesoporous and basic activated carbon filter particles without reduced bulk oxygen percentage by weight.

Those skilled in the art will appreciate that filter particles suitable for use in the present invention include the preferred particles listed directly above, as well as other materials selected from the group consisting of activated carbon powders, activated carbon granules, activated carbon fibers, zeolites, activated alumina, activated magnesia, diatomaceous earth, silver particles, activated silica, hydrotalcites, glass, polyethylene fibers, polypropylene fibers, ethylene maleic anhydride copolymers fibers, sand, clay and mixtures thereof.

One preferred method, but by no means the only method of achieving the desired permeability for the filter blocks of the present invention, is by manipulating the median particle size and decreasing the particle span of the filter particles. Specifically, the preferred permeability can be obtained by making the filter block from filter particles having a median particle size of less than about 50 μm, preferably less than about 40 μm, more preferably less than about 37.5 μm and even more preferably less than about 35 μm. Moreover, it is also preferred that the filter particles have a particle span of about 1.8 or less, preferably 1.5 or less, more preferably 1.4 or less, and even more preferably 1.3 or less.

As described herein the filter blocks of the present invention generally comprise filter particles and a binder. In one preferred aspect of the present invention at least about 50%, preferably at least about 60%, more preferably at least about 70%, and even more preferably at least about 80%, by weight, of the filter particles are activated carbon particles. Those skilled in the art will appreciate that activated carbon particles do not include activated carbon fibers, while both are subsets of the broader category of filter particles. The distinction between fibers and particles is best made by the aspect ratio, that is, a filter particle that has an aspect ratio of greater than about 4:1 is generally classified as a fiber, while a filter particle with an aspect ratio of about 4:1 or less is generally considered a particle.

IV. Coated Filter Particles

The filter particles used to make the filter blocks and filters of the present invention may be coated with a variety of materials that provide certain benefits. For example, the Mitchell et al. U.S. application Ser. Nos. 10/705,572, and 10/705,174 teach a variety of metal and cationic coatings suitable for use in the present invention. These coatings provide viruses and bacteria removal benefits.

When coated filter particles are used, preferably at least a portion of the filter particles is coated with a material selected from the group consisting of silver, a silver-containing material, a cationic polymer and mixtures thereof. Exemplary cationic polymers that may be used in the present invention are selected from the group consisting of: poly(N-methylvinylamine), polyallylamine, polyallyldimethylamine, polydiallylmethylamine, polydiallyl dimethyl ammonium chloride (pDADMAC), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, grafted starch, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amodopropyl trimethyl ammonium chloride (MAPTAC), diallyl dimethyl ammonium chloride (DADMAC), ionenes, silanes and mixtures thereof. Other exemplary cationic polymers that may be used with the present invention may be selected from the group consisting of: polyaminoamides, polyethyleneimine, polyvinylamine, polydiallyl dimethyl ammonium chloride (pDADMAC), polydimethylamine-epichlorohydrin, poly-hexamethylenebiguanide, poly-[2-(2-ethoxy)-ethoxyethlyl-guanidinium]chloride. The exemplary cationic polymers set forth in the paragraph above are for illustration, and not limitation, purposes only. These exemplary cationic polymers set forth above are all similar in properties and characteristics, and thus all are similar in action when coated on the activated carbon filter particles within the filters of the present invention.

In addition to the coatings described above that can assist in the removal or killing of viruses and bacteria, coatings may also be added to improve the flow characteristics of a filter block thus affecting the permeability of the filter blocks. For example, drag reducing polymers can be applied to the filter block to reduce the pressure drop across the filter block. Non limiting examples of drag reducing polymers may include linear polymers such as polyvinylamine, polyvinylalcohol, polyacrylamide, partially hydrolyzed polyacrylamide, and polyethyleneoxide. Other examples will be known to those skilled in the art. Again, these drag reducing polymers are also similar in properties and characteristics, and thus all are similar in action when coated on the activated carbon filter particles within the filters of the present invention. It is understood that all, a portion, or none of the filter particles comprising the filters of the present invention may be coated.

V. Filters of the Present Invention

Examples of filter configurations, potable water devices, consumer appliances, and other water filtration devices suitable for use with the present invention are disclosed in U.S. Pat. Nos. 5,527,451; 5,536,394; 5,709,794; 5,882,507; 6,103,114; 4,969,996; 5,431,813; 6,214,224; 5,957,034; 6,145,670; 6,120,685; and 6,241,899, the substances of which are incorporated herein by reference. Additionally, the patents and applications referenced above and incorporated herein by reference teach filters that may be acceptable for use with the present invention. One preferred method of making filter blocks of the present invention is described below in the Example section.

In addition to the filter blocks disclosed herein, the filters of the present invention may also comprise other filter systems including reverse osmosis systems, ultra-violet light systems, ozone systems, ion exchange systems, electrolyzed water systems, and other water treatment systems known to those with skill in the art. Also, the filters of the present invention may comprise pre-filters wrapped around the filter blocks to prevent the filter blocks from clogging with suspended particles. Furthermore, the filters of the present invention may comprise indicator systems and/or shut-off systems to indicate to the consumer the remaining life/capacity of the filter and to shut-off the filter when the filter's remaining life/capacity is zero.

As previously discussed, the filter material can be provided in either a loose or interconnected form (e.g., partially or wholly bonded by a polymeric binder or other means to form an integral structure).

The filter material may be used for different applications (e.g., use as a pre-filter or post-filter) by varying the size, shape, complex formations, charge, porosity, surface structure, functional groups, etc. of the filter particles as discussed above. The filter material may also be mixed with other materials, as just described, to suit it for a particular use. Regardless of whether the filter material is mixed with other materials, it may be used as a loose bed, a block (including a co-extruded block as described in U.S. Pat. No. 5,679,248, which is herein incorporated by reference), and mixtures thereof. Preferred methods that might be used with the filter material include forming a block filter made by ceramic-carbon mix (wherein the binding comes from the firing of the ceramic), using powder between non-wovens as described in U.S. Pat. No. 6,077,588, which is herein incorporated by reference, using the green strength method as described in U.S. Pat. No. 5,928,588, which is herein incorporated by reference, activating the resin binder that forms the block, which is herein incorporated by reference, or by using a resistive heating method as described in PCT Application Serial No. WO 98/43796. The filter blocks of the present invention can be made by standard extrusion processes known to those skilled in the art. Such processes are described in U.S. Pat. No. 5,331,037 to Koslow et al., which is incorporated herein by reference.

Figure 3:
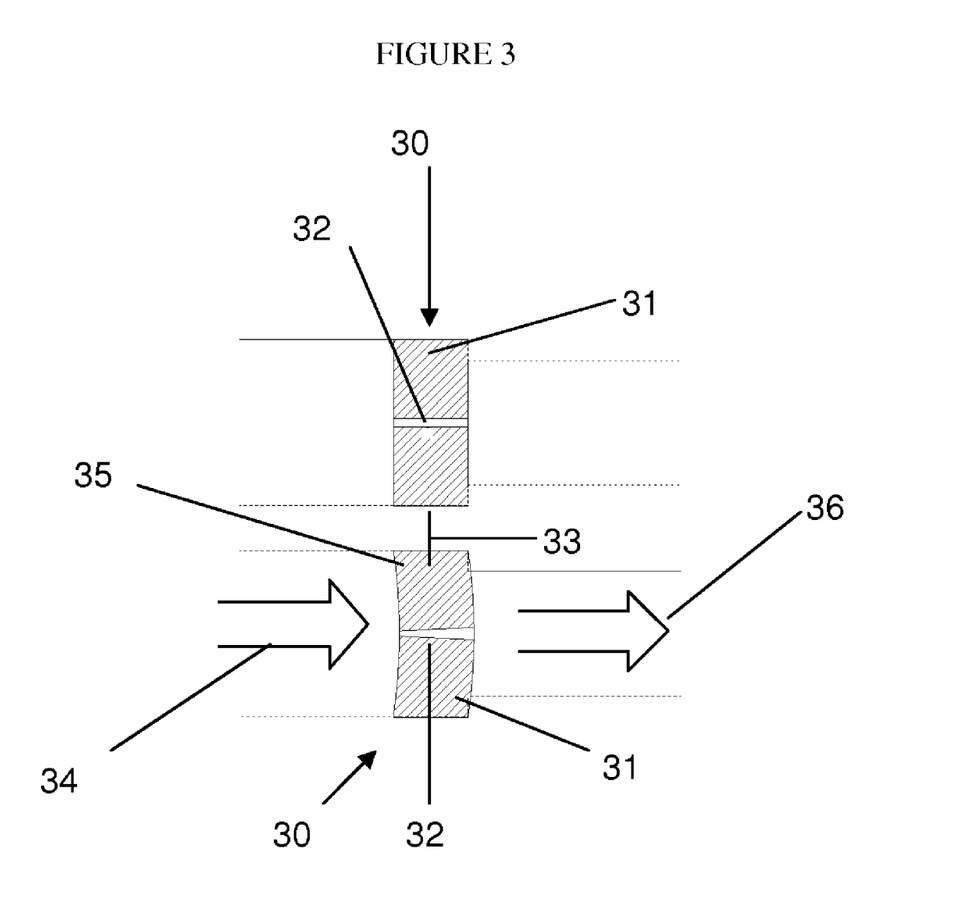
FIG. 3 is a schematic representation of a pressure/flow control device suitable for use with the filters of the present invention.

The flow rate in a high permeability filter system can be controlled with a flow or pressure control device. Pressure/flow control devices include pressure regulators that control the input pressure or the pressure drop across the filter. Direct flow control devices create a variable pressure drop dependant on flow rate. The most common flow control device is a flow washer, for example, 30 as shown in FIG. 3. Flow washer 30 is typically a thick elastomeric washer 31 with an orifice 32 in the center. Flow washer 30 is supported at its perimeter 33 and deflects into a concave shape in response to inlet flow 34. The greater the flow rate the greater the deflection. When flow washer 30 deflects it causes the upstream surface of the orifice 35 to decrease in size (increase in pressure drop) thereby controlling the outlet flow rate 36.

VI. Filter Block Examples

Filter blocks are made according to the present invention and are exemplified below. These examples are not meant to limit the present invention in any way. The permeability and other calculated parameters for Examples 1-4 are given below in Table 1. Moreover, Table 1 includes three comparative examples from prior art publications. The three comparative examples are not intended to be exhaustive representation of the state of the art.

The filter blocks in Examples 1-4 below are made by the following compression molding process and equipment. A filter pneumatic press is used which consists of a doubleended vertically mounted cylinder press, a lower piston and an upper piston. The cylinder press bore diameter is 2" (5.1 cm) and the length is 3" (7.6 cm). The lower piston is driven by a pneumatic cylinder with 1.5" (3.8 cm) diameter and 3" (7.6 cm) length (Mosier Fluid Power of Ohio, Miamisburg, Ohio; Model # EJO155A1), and the upper piston is driven by a pneumatic cylinder with 1.5" (3.8 cm) diameter and 4" (10.2 cm) length (Mosier Fluid Power of Ohio, Miamisburg, Ohio; Model # EJ0377A3). The upper and lower pistons are heated with heat controllers from Omron Corp. (Schaumburg, Ill.; Model # E5CS) and the cylinder press is heated by a band heater from Fast Heat, Inc. (Elmhurst, Ill.; Model # BW020000). The band heater controller is a Variac from Statco Energy Products, Co., Dayton, Ohio (Model # 3PN1010).

About 42 g of carbon is mixed with about 13.2 g of Microthene® low-density polyethylene (LDPE) FN510-00 binder from Equistar Chemicals, Inc. (Cincinnati, Ohio) and about 4.8 g of Alusil® 70 aluminosilicate powder from Selecto, Inc. (Norcross, Ga.). Thus, the total carbon mix is about 60 g. With the upper piston fully retracted and the lower piston in the fully down position, the cylinder press is filled with the carbon mix and the cylinder press wall is gently tapped to settle the mix. The cylinder press is back filled to full and struck off to level the mix. The upper piston is slowly lowered, completely engaged to 60 psi (0.41 MPa) pressure, and held for a few seconds. Then, the pressure is lowered to near zero and the upper piston is slowly retracted. Again, the cylinder press is filled with more carbon mix, the cylinder wall is gently tapped and struck off to level the mix, the upper piston is slowly lowered to full engagement, and the pressure is raised to 60 psi (0.41 MPa). This procedure is repeated one more time to completely fill the cylinder press with carbon mix. After the third fill, the 60 psi (0.41 MPa) pressure is maintained on the upper piston. The cylinder heat controllers are then turned on and the temperature is set to 400° F. (204° C.). The band heater is also turned on and the Variac controlled is set to 70% or approximately 550° F. (288° C.). The heating cycle lasts for 10 minutes. At the end of the heating cycle the three heaters are turned off, the press is allowed to cool pneumatically for approximately 10 minutes with air through both the upper and lower pistons, and the filter is extracted from the cylinder press. The dimensions of the extracted filters are 2" (5.1 cm) OD and about 2.5" (6.4 cm) length. Finally, the filters are made radial flow filters by drilling a central hole, and the outside diameter of the filters is reduced to the final diameter in a lathe.

In all of the Examples below, the liquid used was water, which has a viscosity of 0.01 poise, or 0.01 dynes-s/cm$^2$.

Example 1

A sample of Nuchar® RGC mesoporous and basic wood-based activated carbon particles is obtained from MeadWestvaco Corp. (Covington, Va.). The particle size distribution of the carbon particles is measured with a common light scattering method that is known to the art and the results are as follows: $D_{v,0.50}$=33.2 µm, $D_{v,0.10}$=15.6 µm, $D_{v,0.90}$=63.4 µm, and particle span=1.44. The filter particles are not coated. They are mixed with a binder and compression molded to form a radial flow filter block with the following dimensions: outside radius ($r_2$)=0.75" (1.9 cm), inside radius ($r_1$)=0.188" (0.48 cm), and length=2.3" (5.8 cm). The filter block volume is 62 cm$^3$ (62 mL), and its face area is 70 cm$^2$. To measure the filter block permeability the following conditions are used: flow rate, $Q_r$=625 mL/min (10.4 cm$^3$/s), and pressure drop, $\Delta P_r$=18 psi (0.12 MPa, or 1.24×10$^6$ dynes/cm$^2$). The permeability of the filter block is calculated as 3.30×10$^{-9}$ cm$^2$. The F-VLR of the filter block is measured according to the method described herein and the result of that measurement is: 4.3 log reduction in viruses, that is, greater than 99.99% removal of viruses.

Example 2

A sample of Nuchar® RGC mesoporous and basic wood-based activated carbon particles is obtained from MeadWestvaco Corp. The particle size distribution of the carbon particles is measured with a common light scattering method that is known to the art and the results are as follows: $D_{v,0.50}$=33.2 µm, $D_{v,0.10}$=15.6 µm, $D_{v,0.90}$=63.4 µm, and particle span=1.44. The carbon particles are coated with polyvinyl amine (PVAm). They are mixed with a binder and compression molded to form a radial flow filter block with the following dimensions: outside radius ($r_2$)=0.75" (1.9 cm), inside radius ($r_1$)=0.188" (0.48 cm), and length=2.3" (5.8 cm). The filter block volume is 62 cm$^3$ (62 mL), and its face area is 70 cm$^2$. To measure permeability the following conditions are used: flow rate, $Q_r$=940 mL/min (15.7 cm$^3$/s), and pressure drop, $\Delta P_r$=15 psi (0.10 MPa, or 1.03×10$^6$ dynes/cm$^2$). The permeability of the filter block is calculated as 5.72×10$^{-9}$ cm$^2$. The F-VLR of the filter block is measured according to the method described herein and the result of that measurement is: 4.0 log reduction in viruses, that is, 99.99% removal of viruses.

Example 3

A sample of Nuchar® RGC mesoporous and basic wood-based activated carbon particles is obtained from MeadWestvaco Corp. The carbon particles are fractionated by a common sieving method that is known to the art to obtain the following particle size distribution, which is verified by light scattering: $D_{v,0.50}$=48.8 µm, $D_{v,0.10}$=18.2 µm, $D_{v,0.90}$=78.2 µm, and particle span=1.23. The carbon particles are not coated. They are mixed with a binder and compression molded to form a radial flow filter block with the same dimensions, filter block volume and face area as in Examples 1 and 2. To measure permeability the following conditions are used: flow rate, $Q_r$=625 mL/min (10.4 cm$^3$/s), and pressure drop, $\Delta P_r$=12 psi (0.08 MPa, or 0.83×10$^6$ dynes/cm$^2$). The permeability of the filter block is calculated as 4.75×10$^{-9}$ cm$^2$. The F-VLR of the filter block is measured according to the method described herein and the result of that measurement is: 4.2 log reduction in viruses, that is, greater than 99.99% removal of viruses.

Example 4

Two samples of Nuchar® RGC mesoporous and basic wood-based activated carbon particles with different particle size distributions are obtained from MeadWestvaco Corp. The two samples are blended together and the resulting particle size distribution is measured by light scattering as follows: $D_{v,0.50}$=103.6 µm, $D_{v,0.10}$=23.8 µm, $D_{v,0.90}$=233.1 µm, and particle span=2.02. The carbon particles are coated with polyvinyl amine (PVAm). They are mixed with a binder and compression molded to form a radial flow filter block with the same dimensions, filter block volume and face area as in Examples 1, 2, and 3. To measure permeability the following conditions are used: flow rate, $Q_r$=625 mL/min (10.4 cm$^3$/s), and pressure drop, $\Delta P_r$=8 psi (0.055 MPa, or 0.55×10$^6$ dynes/cm$^2$). The permeability of the filter block is calculated as 7.13×10$^{-9}$ cm$^2$. The F-VLR for the resulting block is measured according to the method described herein and the result of that measurement is: 4.2 log reduction in viruses, that is, greater than 99.99% removal of viruses.

Example 5

A sample of Nuchar® RGC mesoporous and basic wood-based activated carbon particles is obtained from MeadWestvaco Corp. The particle size distribution of the carbon particles is measured with a common light scattering method that is known to the art and the results are as follows: $D_{v,0.50}=33.2$ µm, $D_{v,0.10}=15.6$ µm, $D_{v,0.90}=63.4$ µm, and particle span=1.44. The carbon particles are coated with polydiallyl dimethyl ammonium chloride (pDADMAC). They are mixed with a binder and compression molded to form a radial flow filter block with the following dimensions: outside radius $(r_2)=1''$ (2.5 cm), inside radius $(r_1)=0.25''$ (0.64 cm), and length=2.3'' (5.8 cm). The filter block volume is 111 cm$^3$ (111 mL), and its face area is 93 cm$^2$. To measure permeability the following conditions are used: flow rate, $Q_r=1.5$ L/min (25 cm$^3$/s), and pressure drop, $\Delta P_r=34$ psi (0.23 MPa, or 2.34×106 dynes/cm$^2$). The permeability of the filter block is calculated as $4.03\times10^{-9}$ cm$^2$. The F-VLR of the filter block is measured according to the method described herein and the result of that measurement is: 4.0 log reduction in viruses, that is, 99.99% removal of viruses.

Example 6

A sample of coconut microporous activated carbon particles is obtained from Calgon Carbon Corp. The particle size distribution of the carbon particles is measured with a common light scattering method that is known to the art and the results are as follows: $D_{v,0.50}=87.4$ µm, $D_{v,0.10}=34.2$ µm, $D_{v,0.90}=149.6$ µm, and particle span=1.32. The carbon particles are coated with polydiallyl dimethyl ammonium chloride (pDADMAC). They are mixed with a binder and compression molded to form a radial flow filter block with the following dimensions: outside radius $(r_2)=0.75''$ (1.9 cm), inside radius $(r_1)=0.22''$ (0.6 cm), and length=2.3'' (5.8 cm). The filter block volume is 61 cm$^3$ (61 mL), and its face area is 70 cm$^2$. To measure permeability the following conditions are used: flow rate, $Q_r=940$ mL/min (15.7 cm$^3$/s), and pressure drop, $\Delta P_r=18$ psi (0.12 MPa, or 1.24×106 dynes/cm$^2$). The permeability of the filter block is calculated as $4.23\times10^{-9}$ cm$^2$. The F-VLR of the filter block is measured according to the method described herein and the result of that measurement is: 4.0 log reduction in viruses, that is, 99.99% removal of viruses.

Example 7

A sample of Nuchar® RGC mesoporous and basic wood-based activated carbon particles is obtained from MeadWestvaco Corp. The particle size distribution of the carbon particles is measured with a common light scattering method that is known to the art and the results are as follows: $D_{v,0.50}=44.4$ µm, $D_{v,0.10}=9.5$ µm, $D_{v,0.90}=98.7$ µm, and particle span=2.01. The carbon particles are coated with polydiallyl dimethyl ammonium chloride (pDADMAC). They are mixed with a binder and compression molded to form a radial flow filter block with the following dimensions: outside radius $(r_2)=0.75''$ (1.9 cm), inside radius $(r_1)=0.188''$ (0.48 cm), and length=2.3'' (5.8 cm). The filter block volume is 62 cm$^3$ (62 mL), and its face area is 70 cm$^2$. To measure permeability the following conditions are used: flow rate, $Q_r=640$ mL/min (11 cm$^3$/s), and pressure drop, $\Delta P_r=27$ psi (0.19 MPa, or 1.86×106 dynes/cm$^2$). The permeability of the filter block is calculated as $2.16\times10^{-9}$ cm$^2$. The F-VLR of the filter block is measured according to the method described herein and the result of that measurement is: 4.0 log reduction in viruses, that is, 99.99% removal of viruses.

Example 8

Two samples of Nuchar® RGC mesoporous and basic wood-based activated carbon particles with different particle size distributions are obtained from MeadWestvaco Corp. The two samples are blended together and the resulting particle size distribution is measured by light scattering as follows: $D_{v,0.50}=103.6$ µm, $D_{v,0.10}=23.8$ µm, $D_{v,0.90}=233.1$ µm, and particle span=2.02. The carbon particles are coated with polydiallyl dimethyl ammonium chloride (pDADMAC). They are mixed with a binder and compression molded to form a radial flow filter block with the following dimensions: outside radius $(r_2)=0.75''$ (1.9 cm), inside radius $(r_1)=0.188''$ (0.48 cm), and length=2.3'' (5.8 cm). The filter block volume is 62 cm$^3$ (62 mL), and its face area is 70 cm$^2$. To measure permeability the following conditions are used: flow rate, $Q_r=625$ mL/min (10.4 cm$^3$/s), and pressure drop, $\Delta P_r=27$ psi (0.19 MPa, or 1.86×10$^6$ dynes/cm2). The permeability of the filter block is calculated as $2.11\times10^{-9}$ cm$^2$. The F-VLR for the resulting block is measured according to the method described herein and the result of that measurement is: 4.2 log reduction in viruses, that is, greater than 99.99% removal of viruses.

Example 9

A sample of Nuchar® RGC mesoporous and basic wood-based activated carbon particles is obtained from MeadWestvaco Corp. (Covington, Va.). The particle size distribution of the carbon particles is measured with a common light scattering method that is known to the art and the results are as follows: $D_{v,0.50}=25.1$ µm, $D_{v,0.10}=11.2$ µm, $D_{v,0.90}=52.3$ µm, and particle span=1.64. The mesoporous and basic wood-based activated carbon particles are coated with polydiallyl dimethyl ammonium chloride (pDADMAC). This mesoporous coated carbon is mixed with a microporous coconut carbon from SAI (Pittsburgh, Pa.) and a lead adsorbent amorphous titanium silicate from Engelhard Corp. Islen, N.J. They are mixed with a binder and compression molded to form a radial flow filter block with the following dimensions: outside radius $(r_2)=1''$ (2.54 cm), inside radius $(r_1)=0.25''$ (0.635 cm), and length=2.5'' (6.35 cm). The filter block volume is 121 cm$^3$ (121 mL), and its face area is 101 cm$^2$. To measure the filter block permeability the following conditions are used: flow rate, $Q_r=2500$ mL/min (41.7 cm$^3$/s), and pressure drop, $\Delta P_r=60$ psi (4.14×10$^6$ dynes/cm$^2$). The permeability of the filter block is calculated as $7.03\times10^{-9}$ cm$^2$. The F-VLR of the filter block is measured according to the method described herein and the result of that measurement is: 4.7 log reduction in viruses, that is, greater than 99.99% removal of viruses.

Example 10

This is a prophetic example that the inventors have based upon insight and knowledge gained from the above actual experiments. The insight, knowledge, and actual results from the actual examples set forth above were then extrapolated to predict the following results for this prophetic example. A sample of Nuchar® RGC mesoporous and basic wood-based activated carbon particles may be obtained from MeadWestvaco Corp. (Covington, Va.). The particle size distribution of the carbon particles is measured with a common light scattering method that is known to the art and the results would be as follows: $D_{v,0.50}$=36.6 µm, $D_{v,0.10}$=12.3 µm, $D_{v,0.90}$=70.5 µm, and particle span=1.61. The mesoporous and basic wood-based activated carbon particles would be coated with polydiallyl dimethyl ammonium chloride (pDADMAC). However, it is understood that the activated carbon particles could be uncoated as well. The activated carbon particles would then be mixed with a binder and compression molded to form a radial flow filter block with the following dimensions: outside radius ($r_2$)=0.75" (1.9 cm), inside radius ($r_1$)=0.188" (0.48 cm), and length=2.3" (5.8 cm). The filter block volume would be 62 cm$^3$ (62 mL), and its face area is 70 cm$^2$. To measure the filter block permeability the following conditions would be used: flow rate, $Q_r$=945 mL/min (15.75 cm$^3$/s), and pressure drop, $\Delta P_r$=40 psi (2.76×106 dynes/cm$^2$). Based upon the parameters above, the permeability of the filter block would be calculated as 3.63×10$^{-9}$ cm$^2$. The F-VLR of the filter block would be measured according to the method described herein and the result of that measurement would be: 4.2 log reduction in viruses, which is, greater than 99.99% removal of viruses.

Table 1 below gives the permeability of the ten filter blocks exemplified above (i.e., Examples 1-10) and three filter blocks from prior art publications (i.e., Examples 11-13). Additional information about the filter blocks is also given.

ATCC # 25922 (American Type Culture Collection, Rockville, Md.). The *E. coli* assay can be conducted using the membrane filter technique according to process # 9222 of the 20$^{th}$ edition of the "Standard Processes for the Examination of Water and Wastewater" published by the American Public Health Association (APHA), Washington, D.C., the substance of which is herein incorporated by reference. Other assays known in the art can be substituted (e.g. COLILERT®). The limit of detection (LOD) is about 1×10$^2$ CFU/L when measured by the membrane filter technique, and about 10 CFU/L when measured by the COLILERT® technique. Effluent water is collected after the flow of about the first 2,000 filter material pore volumes, assayed to count the *E. coli* bacteria present, and the F-BLR is calculated using the definition.

F-VLR Test Procedure

The housings are the same as those described in the F-BLR procedure above. Water contaminated with about 1×10$^7$ PFU/L MS-2 flows through a housing/filter system at a flow rate of at least about 600 mL/min. The measurements of the effluent are made after the volumetric flow of liquid through the filter block is equal to at least 10 filter block volumes. The MS-2 bacteriophages used are the ATCC # 15597B (American Type Culture Collection, Rockville, Md.). The MS-2

TABLE 1

| | EXAMPLE # | | | | | | | | | | | | |
|---|---|---|---|---|---|---|---|---|---|---|---|---|---|
| | 1 | 2 | 3 | 4 | 5 | 6 | 7 | 8 | 9 | 10 | 11* | 12* | 13* |
| F-VLR | 4.3 | 4.0 | 4.2 | 4.2 | 4.0 | 4.0 | 4.0 | 4.2 | 4.7 | 4.2 | 4.2 | <<3 | 6 |
| Permeability, [×10$^{-9}$ cm$^2$] | 3.30 | 5.72 | 4.75 | 7.13 | 4.03 | 4.23 | 2.16 | 2.11 | 7.03 | 3.63 | 0.79 | 0.73/1.36 | 1.20 |
| Radial Flow? | Yes | Yes | Yes | Yes | Yes | Yes | Yes | Yes | Yes | Yes | No | Yes | Yes |
| Filter block volume, [mL] | 62 | 62 | 62 | 62 | 111 | 61 | 62 | 62 | 121 | 62 | 58 | 263 | 2482 |
| Outside Diameter, [cm] | 3.8 | 3.8 | 3.8 | 3.8 | 5.0 | 3.8 | 3.8 | 3.8 | 5.08 | 3.8 | 7.6 | 5.1 | 12.9 |
| Face Area, [cm$^2$] | 70 | 70 | 70 | 70 | 93 | 70 | 70 | 70 | 101 | 70 | 45.6 | 405 | 811 |
| Particle Span, [—] | 1.44 | 1.44 | 1.23 | 2.02 | 1.44 | 1.32 | 2.01 | 2.02 | 1.64 | 1.61 | 2.01 | Unknown | 2.8 |
| $D_{v,0.50}$ [µM] | 33.2 | 33.2 | 48.8 | 103.6 | 33.2 | 87.4 | 44.4 | 103.6 | 25.1 | 36.6 | 45 | >45 | 30 |

*Examples from published patents and applications.
Example 11 = Example No. 3 from US Patent Publication No. 2003/0217963A1 to Mitchell et al.
Example 12 = From the Example in U.S. Pat. No. 6,395,190 to Koslow et al.
Example 13 = the first Embodiment from US Patent Publication No. 2003/0034290 A1 to Tochikubo et al.
For Examples 11, 12, and 13 the particle size distributions are disclosed as weight fractions rather than volume. But those skilled in the art will appreciate that for a sample of one type of particle, as was the case in each of these three examples, the density of the particles will be the same and hence the volumetric particle size distribution will be the same as the weight based particle size distribution.
Unknown = these parameters could not be determined from the information in the published reference.
All blocks in Table 1 were compression molded except Example 11, which was made by an extrusion process.
No Metallic biocides were used in any of the examples.

VII. Test and Calculation Procedures

The following test procedures are used to calculate the F-VLR and F-BLR.

F-BLR Test Procedure

The filter block to be tested is mounted inside a housing fitted for the filter block and its flow characteristics (axial, radial, etc.) and water contaminated with about 1×10$^8$ CFU/L *E. coli* flows through at a flow rate of at least about 600 mL/min. The measurements of the effluent are made after the volumetric flow of liquid through the filter block is equal to at least 10 filter block volumes. The *E. coli* bacteria used are the assay can be conducted according to the procedure by C. J. Hurst, Appl. Environ. Microbiol., 60(9), 3462 (1994), the substance of which is herein incorporated by reference. Other assays known in the art can be substituted. The limit of detection (LOD) is 1×10$^3$ PFU/L. Effluent water is collected after the flow of about the first 2,000 filter material pore volumes, assayed to count the MS-2 bacteriophages present, and the F-VLR is calculated using the definition.

The present invention may additionally include information that will communicate to the consumer, by words and/or by pictures, that use of carbon filter particles and/or filter material of the present invention will provide benefits which include removal of microorganisms, and this information may include the claim of superiority over other filter products. In a highly desirable variation, the information may include that use of the invention provides for reduced levels of nano-sized microorganisms. Accordingly, the use of packages in association with information that will communicate to the consumer, by words and or by pictures, that use of the invention will provide benefits such as potable, or more potable water as discussed herein, is important. The information can include, e.g., advertising in all of the usual media, as well as statements and icons on the package, or the filter itself, to inform the consumer.

All documents cited in the Detailed Description of the Invention are, in relevant part, incorporated herein by reference, the citation of any document is not to be construed as an admission that it is prior art with respect to the present invention.

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A filter block comprising activated carbon filter particles without metallic biocides, wherein the activated carbon filter particles have a median particle size of less than or equal to about 90 μm and a particle span of less than or equal to about 1.7, and wherein the filter block has a permeability of greater than about $3.0 \times 10^{-9}$ cm2 and a Filter Viruses Log Removal of greater than about 2 logs.

2. The filter block of claim 1, wherein the activated carbon particles are microporous activated carbon filter particles.

3. The filter block of claim 2, further comprising activated carbon filter particles selected from the group consisting of mesoporous activated carbon particles, activated coconut carbon particles, zeolites, activated alumina, activated magnesia, diatomaceous earth, activated silica, hydrotalcites, glass, polyethylene fibers, polypropylene fibers, ethylene maleic anhydride copolymer fibers, sand, clay, coconut, and mixtures thereof.

4. The filter block of claim 1, wherein the activated carbon particles are mesoporous activated carbon filter particles.

5. The filter block of claim 4, wherein the sum of the mesopore and the macropore volumes of said mesoporous activated carbon filter particles is between about 0.2 mL/g and about 2 mL/g.

6. The filter block of claim 4, further comprising microporous activated carbon filter particles.

7. The filter block of claim 1, wherein a portion of the activated carbon filter particles are coated with a cationic polymer.

8. The filter block of claim 7, wherein the cationic polymer is selected from the group consisting of: polyvinylamine, poly(N-methylvinylamine), polyallylamine, polyallyldimethylamine, polydiallylmethylamine, polydiallyl dimethyl ammonium chloride (pDADMAC), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, grafted starch, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amodopropyl trimethyl ammonium chloride (MAPTAC), diallyl dimethyl ammonium chloride (DADMAC), ionenes, silanes and mixtures thereof.

9. The filter block of claim 7, wherein the cationic polymer is polydiallyl dimethyl ammonium chloride (pDADMAC).

10. The filter block of claim 7, wherein the cationic polymer is a drag reducing polymer selected from the group consisting of: polyvinylamine, polyvinylalcohol, polyacrylamide, partially hydrolyzed polyacrylamide, and polyethyleneoxide.

11. The filter block of claim 1, wherein the filter block has a Filter Viruses Log Removal of greater than about 4 logs.

12. The filter block of claim 11, wherein the filter block has a Filter Bacteria Log Removal of greater than about 6 logs.

13. A filter block comprising:
   a) mesoporous activated carbon filter particles without metallic biocides;
   b) wherein the mesoporous activated carbon filter particles have a median particle size of less than or equal to about 104 μm and a particle span of less than or equal to about 2.05;
   c) wherein at least a portion of the filter particles are coated with a cationic polymer; and
   d) wherein the filter block has a permeability of greater than about $2.0 \times 10^{-9}$ cm$^2$ and a Filter Viruses Log Removal of greater than about 2 logs.

14. The filter block of claim 13, wherein the block comprises filter particles having a median particle size of less than about 50 μm and having a particle span of about 1.7 or less.

15. The filter block of claim 14, wherein the particle span is less than about 1.64.

16. The filter block of claim 13, wherein the cationic polymer is selected from the group consisting of: polyvinylamine, poly(N-methylvinylamine), polyallylamine, polyallyldimethylamine, polydiallylmethylamine, polydiallyl dimethyl ammonium chloride (pDADMAC), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, grafted starch, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amodopropyl trimethyl ammonium chloride (MAPTAC), diallyl dimethyl ammonium chloride (DADMAC), ionenes, silanes and mixtures thereof.

17. The filter block of claim 13, wherein the cationic polymer is polydiallyl dimethyl ammonium chloride (pDADMAC).

18. The filter block of claim 13, wherein the cationic polymer is a drag reducing polymer, and wherein the permeability is greater than about $4.0 \times 10^{-9}$ cm$^2$.

19. The filter block of claim 18, wherein the drag reducing polymer is selected from the group consisting of: polyvinylamine, polyvinylalcohol, polyacrylamide, partially hydrolyzed polyacrylamide, and polyethyleneoxide.

20. The filter block of claim 18, wherein the drag reducing polymer is polyvinylamine.

21. The filter block of claim 13, further comprising filter particles selected from the group consisting of microporous activated carbon particles, activated coconut carbon particles, zeolites, activated alumina, activated magnesia, diatomaceous earth, activated silica, hydrotalcites, glass, polyethylene fibers, polypropylene fibers, ethylene maleic anhydride copolymer fibers, sand, clay, coconut, and mixtures thereof.

22. The filter block of claim 13, wherein the median particle size of the mesoporous activated carbon filter particles is less than or equal to about 45 μm and the particle span is less than or equal to about 1.65, and wherein the permeability is greater than about $3.6 \times 10^{-9}$ cm$^2$.

23. The filter block of claim 13, wherein the Filter Viruses Log Removal is greater than about 4 logs.

24. The filter block of claim 23, wherein the filter block has a Filter Bacteria Log Removal of greater than about 6 logs.

25. The filter block of claim 13, wherein the sum of the mesopore and the macropore volumes of said mesoporous activated carbon filter particles is between about 0.2 mL/g and about 2 mL/g.

\* \* \* \* \*